United States Patent [19]

Schwartz et al.

[11] Patent Number: 5,314,936
[45] Date of Patent: May 24, 1994

[54] AQUEOUS POLYMER DISPERSIONS CONTAINING ORGANIC COMPOUNDS HAVING CARBONATE GROUPS AND CARBONYL GROUPS AND PAINTS AND COATING SYSTEMS PRODUCED THEREWITH

[75] Inventors: Manfred Schwartz, Munich; Reinhard Baecher, Bad Duerkheim; Bernhard Dotzauer, Maxdorf; Eckehardt Wistuba, Bad Duerkheim; Andreas Boettcher, Nussloch, all of Fed. Rep. of Germany

[73] Assignee: BASF Aktiengesellschaft, Ludwigshafen, Fed. Rep. of Germany

[21] Appl. No.: 834,206

[22] Filed: Feb. 12, 1992

[30] Foreign Application Priority Data

Feb. 21, 1991 [DE] Fed. Rep. of Germany ....... 4105354

[51] Int. Cl.$^5$ ............................................. C08K 5/45
[52] U.S. Cl. ......................................... 524/82; 524/89; 524/110; 524/186; 524/285; 524/357; 524/359
[58] Field of Search ............... 524/359, 285, 82, 89, 524/110, 186, 357

[56] References Cited

U.S. PATENT DOCUMENTS

| | | | |
|---|---|---|---|
| 4,602,097 | 7/1986 | Curtis | 549/27 |
| 4,999,218 | 3/1991 | Rehmer | 427/54.1 |
| 5,162,415 | 11/1992 | Rehmer et al. | 524/359 |

FOREIGN PATENT DOCUMENTS 0300378 1/1989 European Pat. Off. ..
0355028 2/1990 European Pat. Off. ..

*Primary Examiner*—Judy M. Reddick
*Attorney, Agent, or Firm*—Oblon, Spivak, McClelland, Maier & Neustadt

[57] ABSTRACT

The invention relates to an aqueous polymer dispersion which may optionally contain mineral additives and/or pigments and which essentially consists of a mixture of
A) a 20% to 65% w/w aqueous dispersion of a copolymer of
  (a) an olefinically unsaturated compound containing one or more carboxyl groups and/or amide groups, and
  (b) at least two monomers selected from the group consisting of acrylates and methacrylates and vinylaromatic compounds, and
B) from 0.1 to 5% w/w, based on the weight of the copolymer contained in component (A), of at least one aromatic ketone of the general formula (I)

$$R-\overset{O}{\underset{\|}{C}}-R^1, \qquad (I)$$

in which R stands for an alkyl or aryl radical and $R^1$ stands for an aryl radical containing from 1 to 3 radicals of the formula —O—C(O)—O— attached to one or more oxaalkylene groups.

Such polymer dispersions are suitable for the manufacture of paints and coating systems.

4 Claims, No Drawings

AQUEOUS POLYMER DISPERSIONS CONTAINING ORGANIC COMPOUNDS HAVING CARBONATE GROUPS AND CARBONYL GROUPS AND PAINTS AND COATING SYSTEMS PRODUCED THEREWITH

DE-A 3,827,975 and DE-A 4,003,909 describe coating systems containing aromatic ketones, preferably benzophenone, which undergo cross-linking when exposed to UV radiation. DE-A 3,930,585 describes paint systems which are also capable of cross-linking under UV radiation due to the presence of aromatic ketones, preferably benzophenone, or copolymerizable derivatives thereof. These citations refer to solid photoinitiators, which cause discoloration of the products even when added in low concentrations.

U.S. Pat. No. 4,602,097 describes colored ethoxylated benzophenone derivatives based on 3- or 4-hydroxybenzophenones, in which the ethylene oxide groups are linked to the benzophenone framework via an ether oxygen atom.

It is an object of the present invention to overcome the above drawbacks.

We have now found that no discoloration of the polymeric products occurs before or after irradiation, surprisingly, when use is made of specific photoinitiators which contain carbonyl groups and carbonate groups and absorb radiation below 400 nm and are virtually colorless. When corresponding thioxanthone derivatives are used, their absorption maxima are found to be in the long-wave range, but this is accompanied by slight discoloration of the photoinitiator.

The present invention relates to an aqueous polymer dispersion optionally containing mineral additives and/or pigments, which essentially consists of a mixture of A) a 20 to 65% w/w aqueous dispersion of a copolymer of
  (a) from 0.5 to 5% w/w of units of an olefinically unsaturated compound containing one or more carboxyl groups and/or amide groups, and,
  (b) in an amount to total 100% w/w, units of at least two monomers selected from the group consisting of acrylates and methacrylates of $C_1$–$C_{18}$-alkanols and vinylaromatic compounds, and B) from 0.1 to 5% w/w, based on the weight of the copolymer contained in component (A), of at least one aromatic ketone of the general formula (I)

(I)

in which
R stands for a straight-chain $C_1$–$C_4$-alkyl radical, for a branched-chain $C_3$–$C_4$-alkyl radical, optionally substituted, for a $C_8$–$C_{20}$-aryl radical, or for a radical $R^1$, where
$R^1$ has the following formula

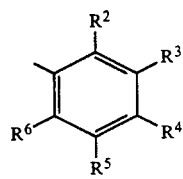

in which
$R^2$ to $R^6$ are the same or different and can stand for H, $C_1$–$C_4$-alkyl, or phenyl, provided that at least one but not more than three of the radicals $R^2$ to $R^6$ stand for a radical of the formula

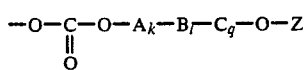

in which
A, B and C may be the same or different and each can stand for a divalent oxaalkylene radical of the formula

where $R^a$ and $R^b$ are the same or different and denote H, OH, aryl, COOH, $COOCH_3$, $COOC_2H_5$, or $C_1$–$C_4$-alkyl, and
y is an integer from 1 to 80,
for a radical of the formula

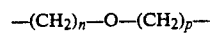

where n is an integer from 1 to 5 and p is an integer from 1 to 5,
for a polyoxaalkylene radical of from 2 to 20 oxygen atoms linked by at least one —$CH_2$— or —$CH_2$—$CH(CH_3)$—group,
for a radical of the formula
—$(CH_2)_m$—O—CO—O—$(CH_2)_n$—,
—$(CH_2)_n$—O—CO—NH—$(CH_2)_m$—,
—$(CH_2)_n$—NH—CO—O—$(CH_2)_m$—,
—$(CH_2)_m$—CO—O—$(CH_2)_n$—, or
—$(CH_2)_m$—O—CO—$(CH_2)_n$—,
where m is an integer from 1 to 10 and n is an integer from 1 to 10,
for a $C_5$–$C_{10}$-cycloalkylene radical, optionally substituted, or a (bis)methylenecycloalkylene radical of from 6 to 12 carbon atoms or an o-, m- or p-phenylene radical, optionally substituted, and
k, l and q are each an integer from 1 to 80, and
$A_k$ and $C_q$ can alternatively be single bonds and at least one of the radicals $A_k$, $B_l$, and $C_q$ contains at least two oxygen atoms, and
Z stands for H, $C_1$–$C_6$-alkyl, phenyl, phenyl substituted by straight-chain or branched-chain $C_1$–$C_{20}$-alkyl, or a radical of the formula

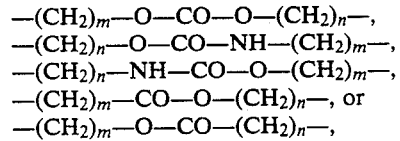

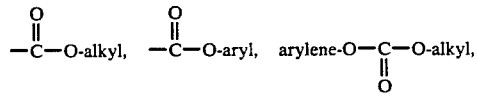

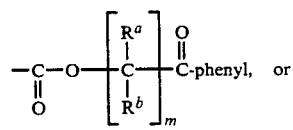

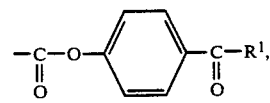

in which the alkyl radicals may contain from 1 to 8 carbon atoms and the aryl radical from 6 to 18 carbon atoms, or when R denotes an aryl radical, one of the radicals $R^2$ to $R^6$ can stand for a sulfur atom which links the aryl radical to $R^1$ in its ortho-position.

The present invention also relates to a method of producing a coating or impregnation which comprises irradiating an aqueous polymer dispersion of the invention, which may optionally contain mineral additives and/or pigments, with UV light and/or natural sunlight during and/or after drying.

The present invention further relates to a paint or coating system for the production of coatings which are irradiated with UV light and/or natural sunlight during and/or after drying, and which contains an aqueous polymer dispersion of the invention, the glass transition temperature of the copolymer prior to cross-linking being from $-35°$ to $+70°$ C.

The said coating system may additionally contain a cross-linking agent based on a zinc salt and/or other cross-linking means.

The present invention also relates to a method of coating an unset concrete roof tile, wherein a mixture of A) a 20 to 65% w/w aqueous dispersion of a copolymer of
   (a) from 0.5 to 5% w/w of units of an olefinically unsaturated compound containing one or more carboxyl groups and/or amide groups, and
   (b) from 0.1 to 5% w/w of units of a carbonyl group-containing monomer cross-linked with a dihydrazide of an aliphatic $C_2$-$C_{10}$-dicarboxylic acid, and,
   (c) in an amount to total 100% w/w, units of at least two monomers selected from the group consisting of acrylates and methacrylates of $C_1$-$C_{18}$-alkanols and vinylaromatic compounds in such a manner and in such proportions as to adjust the glass transition temperature of the copolymer prior to cross-linking to a value from $-35°$ to $+30°$ C. and B) from 0.1 to 3% w/w, based on the weight of the copolymer contained in component (A), of at least one aromatic ketone of the general formula (I) defined above, is applied to the unset concrete roof tile and the resulting coating is irradiated during and/or after drying with UV light and/or natural sunlight.

In a preferred embodiment of such a method, the unset concrete roof tile is provided with a coating consisting of a mixture of A) a 20 to 65% w/w aqueous dispersion of a copolymer of
   (a) from 0.5 to 5% w/w of units of an olefinically unsaturated compound containing one or more carboxyl groups and/or amide groups, and,
   (b) in an amount to total 100% w/w, units of at least two monomers selected from the group consisting of acrylates and methacrylates of $C_1$-$C_{18}$-alkanols and vinylaromatic compounds in such a manner and in such proportions as to adjust the glass transition temperature of the copolymer prior to cross-linking to a value of from $-35°$ to $+30°$ C., and B) from 0.1 to 3% w/w, based on the weight of the copolymer contained in component (A), of an aromatic ketone of the general formula (I), which coating is irradiated during and/or after drying with UV light and/or natural sunlight.

A particularly preferred embodiment of the method of the invention consists in the use a mixture of A) a 20 to 65% w/w aqueous dispersion of a copolymer of
   (a) from 0.5 to 5% w/w of units of an olefinically unsaturated compound containing one or more carboxyl groups and/or amide groups, and,
   (b) in an amount to total 100% w/w, units of at least two monomers selected from the group consisting of acrylates and methacrylates of $C_1$-$C_{18}$-alkanols and vinylaromatic compounds in such a manner and in such proportions as to adjust the glass transition temperature of the copolymer prior to cross-linking to a value of from $-35°$ to $+70°$ C., and B) from 0.1 to 3% w/w, based on the weight of the copolymer contained in component (A), of an aromatic ketone of the following structure:

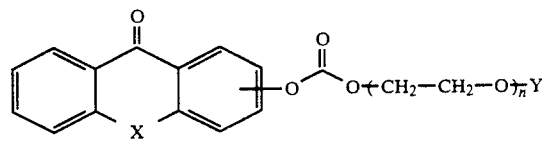

or

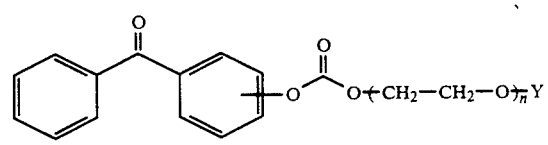

or

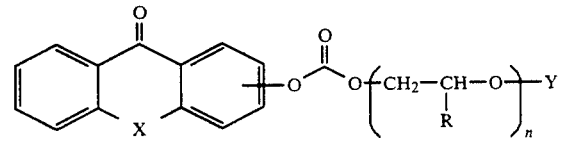

or

-continued

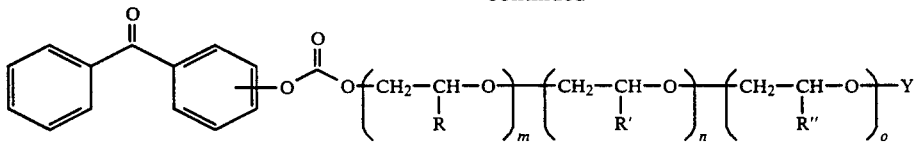

or

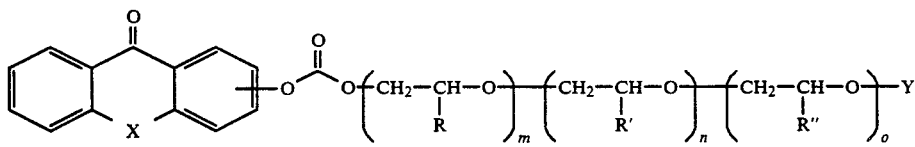

or

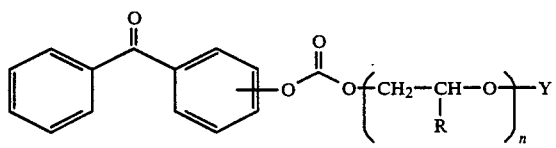

where X is O, S, NH or NR,

R, R' and R" are independently H or $C_1$-$C_8$-alkyl, and

Y is H, $C_1$-$C_8$-alkyl, phenyl, phenyl substituted by a $C_1$-$C_{20}$-substituent, or a radical of the formula

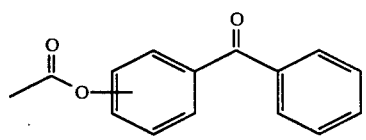

where n, m and o are independently integers from 1 to 80, and optionally

C) a zinc salt cross-linking agent and/or some other cross-linking system, and the resulting coating is irradiated during and/or after drying with UV light or natural sunlight.

Due to its liquid state, the photoinitiator to be used according to the invention is easy to blend with the dispersions. Its surface activity allows it to serve at least partly as a substitute for the emulsifier(s) normally used in the polymer dispersions. In addition, it causes no discoloration during or after irradiation.

There now follows a more detailed description of the components of the aqueous polymer dispersion of the invention and its applications.

A) The component (A) contained in the aqueous polymer dispersions comprises from 20% to 65% w/w, and preferably from 30% to 55% w/w, based on the aqueous dispersion, of a copolymer of (a) from 0.5 to 5% w/w of an olefinically unsaturated compound containing one or more carboxyl groups and/or amide groups, for example acrylic acid, methacrylic acid, acrylamide, or methacrylamide, or possibly some other functionalized monomer such as vinylsulfonic acid, and, (b) in an amount to total 100% w/w, at least two monomers selected from the group consisting of acrylates and methacrylates of $C_1$-$C_{18}$-alkanols and preferably of $C_1$-$C_8$-alkanols, for example methyl methacrylate, t-butyl acrylate, n-butyl acrylate, and 2-ethylhexyl acrylate, and vinylaromatic compounds, for example styrene and α-methylstyrene, which monomers (b) are selected preferably in such proportions that the glass transition temperature of the copolymer prior to cross-linking is from −30° to +70° C. The rules concerning the required weight of a particular monomer to achieve a desired glass transition temperature are known to the person skilled in the art. A distinction is frequently drawn between "hardening" and "plasticizing" monomers.

The terms "hardening" and "plasticizing" refer to monomers such as the literature frequently loosely describes as being "hard" or "soft" respectively, that is to say, monomers which, when polymerized alone, produce either rigid or soft homopolymers. In this context it is usual to regard as hardening monomers those monomers which give homopolymers having a glass transition temperature of from about 25° to 120° C. and as plasticizing monomers those which yield homopolymers having a glass transition temperature of from −60° to +25° C. There is of course no sharp line of demarcation between these two groups, but there are certain representatives which are typical of each group of monomers. Thus typical hardening monomers pertaining to the acrylates and methacrylates are for example methyl methacrylate and t-butyl acrylate. Examples of olefinically unsaturated monomers having a hardening effect are styrene and α-methylstyrene. Typical plasticizing monomers are n-butyl acrylate and 2-ethylhexyl acrylate.

Preferred copolymers are those consisting of from 40% to 59% w/w of styrene and from 60% to 38% w/w of n-butyl acrylate, or of from 40% to 59% w/w of methyl methacrylate and from 60% to 39% w/w of 2-ethylhexyl acrylate, as component (b), and of from 0.5% to 2.5% w/w and preferably 2% w/w of acrylic acid, as component (a), the percentages of (a) and (b) totalling 100.

The manufacture of aqueous dispersions of copolymers of components (a) and (b) and the ingredients normally used for this purpose, such as polymerization initiators or initiator systems, for example sodium peroxydisulfate or dibenzoyl peroxide, emulsifiers, for example sodium laurylsulfate, sodium oleate, the sodium salt of a sulfuric acid half-ester of an isononylphenol ethoxylate with an average of 25 ethylene oxide units, the sodium salt of a sulfonic $C_{12}$–$C_{14}$-alkane, and mixtures thereof with isononylphenol ethoxylate with an average of 25 ethylene oxide units, or a $C_{16}$–$C_{18}$ fatty alcohol ethoxylate containing 22 ethylene oxide units, and buffering substances, for example $Na_2P_2O_7$, have been known in the art for many years and are described, for example, in The *Encyclopedia of Polymer Science and Engineering*, Vol. 6 (1986), pp. 1 to 52.

B) The component (B) of the aqueous dispersion of the invention comprises from 0.1% to 5% w/w, and preferably from 0.2% to 2% w/w, based on the weight of the copolymer contained in component (A), of at least one ketone of the general formula (I)

(I)

in which

R stands for a straight-chain $C_1$–$C_4$-alkyl radical, for example methyl, ethyl, n-propyl, or butyl, for a branched-chain $C_3$–$C_4$-alkyl radical, optionally substituted, for example isopropyl or isobutyl, for a $C_6$–$C_{20}$-aryl radical, for example phenyl, naphthyl, tosyl, or xylyl, or for a radical $R^1$, where $R^1$ has the following formula

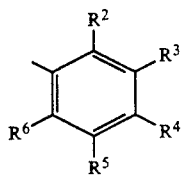

in which $R^2$ to $R^6$ are the same or different and can stand for H, $C_1$–$C_4$-alkyl, for example methyl, ethyl, isopropyl, butyl, or for phenyl, provided that at least one but not more than three of the radicals $R^2$ to $R^6$ stand for a radical of the formula

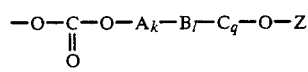

in which

A, B and C may be the same or different and each can stand for a divalent oxaalkylene radical of the formula

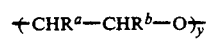

where y is an integer from 1 to 80 and $R^a$ and $R^b$ are the same or different and denote H, OH, aryl, eg phenyl, COOH, $COOCH_3$, $COOC_2H_5$, or $C_1$–$C_4$-alkyl, for a radical of the formula
—(CH$_2$)$_n$—O—(CH$_2$)$_p$— where n is an integer from 1 to 5 and p is an integer from 1 to 5, for a polyoxaalkylene radical of from 2 to 20 oxygen atoms linked by at least one —CH$_2$— or —CH$_2$—CH(CH$_3$)-group, for a radical of the formula
—(CH$_2$)$_m$—O—CO—O—(CH$_2$)$_n$—,
—(CH$_2$)$_n$—O—CO—NH—(CH$_2$)$_m$—,
—(CH$_2$)$_n$—NH—CO—O—(CH$_2$)$_m$—,
—(CH$_2$)$_m$—CO—O—(CH$_2$)$_n$—, or
—(CH$_2$)$_m$—O—CO—(CH$_2$)$_n$—, where m is an integer from 1 to 10 and n is an integer from 1 to 10, for a $C_5$–$C_{10}$-cycloalkylene radical, optionally substituted, for example a cyclohexylene radical, or for a (bis)methylenecycloalkylene radical of from 6 to 12 carbon atoms or for an o-, m- or p-phenylene radical, optionally substituted, and k, l and q are each an integer from 1 to 80, and $A_k$ and $C_q$ can alternatively be single bonds and at least one of the radicals $A_k$, $B_l$, and $C_q$ contains at least two oxygen atoms, and Z stands for H, $C_1$–$C_6$-alkyl (e.g. isopropyl or t-butyl) phenyl, phenyl substituted by straight-chain or branched-chain $C_1$–$C_{20}$-alkyl, or a radical of the formula

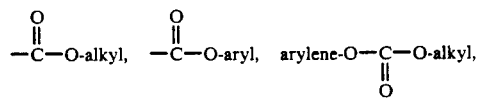

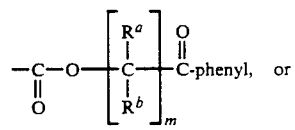

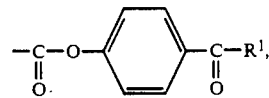

in which the alkyl radicals may contain from 1 to 8 carbon atoms and the aryl radical from 6 to 18 carbon atoms, or when R denotes an aryl radical, one of the radicals $R^2$ to $R^6$ can stand for a sulfur atom which links the aryl radical to $R^1$ in its orthoposition.

Surprisingly, the aqueous polymer dispersions of the invention show good stability on storage and excellent dispersibility.

Compounds of the general formula (I) and the preparation thereof are described in DE-A 4,105,355. A process for the preparation of a compound of the general formula (I), can be by reacting a compound of the general formula (II')

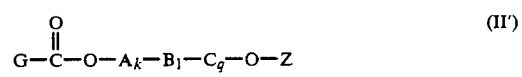
(II')

in which

A, B, C, k, l, q, and Z have the meanings stated above for formula (I), and

G stands for a group selected from tosylate, $C_1$–$C_5$-alkoxy, halogen, such as chlorine or bromine, imidazolyl, pyrazolyl, and phosphonium, sulfonium, ammonium and pyridinium cations, with a compound of the general formula (IIIa)

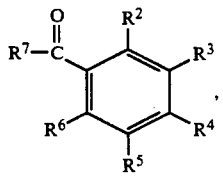

(IIIa)

in which

R² to R⁶ have the meanings stated above for formula (I) and

R⁷ stands for a straight-chain $C_1$-$C_4$-alkyl radical, preferably methyl, ethyl, or n-propyl, for a branched-chain $C_3$-$C_4$-alkyl radical, optionally substituted, such as isopropyl, s-hydroxy-isopropyl, s-dimethylaminopropyl, s-morpholinopropyl, or t-butyl, or for a $C_6$-$C_{20}$-aryl radical, for example phenyl, tolyl or naphthyl, provided that at least one of the radicals R² to R⁶ stands for a hydroxyl group, in an equimolar ratio or in a molar ratio of 2:1 or 3:1 depending on the number of hydroxyl groups in the radicals R² to R⁶, optionally in the presence of an inert solvent or solvent mixture and a basic catalyst, at a temperature of from 0° to 100° C. under anhydrous conditions.

A compound of the general formula (I) may also be prepared, wherein a compound of the general formula (IV)

HO—A$_k$—B$_l$—C$_q$—O—Z          (IV)

in which A, B, C, k, l, q and Z have the meanings stated above for formula (I), is reacted with a compound of the general formula (IIIb)

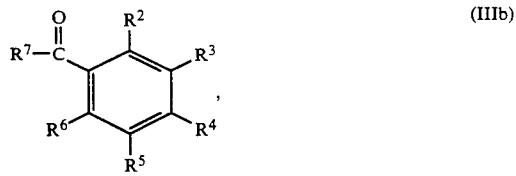

(IIIb)

in which

R² to R⁶ have the meanings stated above for formula (I) and

R⁷ stands for a straight-chain $C_1$-$C_4$-alkyl radical, a branched-chain $C_3$-$C_4$-alkyl radical, optionally substituted, or a $C_6$-$C_{20}$-aryl radical, provided that at least one of the radicals R² to R⁶ denotes a group of the formula

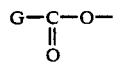

G—C—O—
‖
O in which

G stands for tosylate, $C_1$-$C_5$-alkoxy, halogen, e.g. chlorine or bromine, imidazolyl, pyrazolyl or a phosphonium, sulfonium, ammonium or pyridinium cation, in an equimolar ratio or in a molar ratio of 2:1 or 3:1 depending on the number of groups of the formula

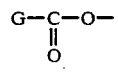

G—C—O—
‖
O in the radicals R² to R⁶, optionally in the presence of an inert solvent or solvent mixture and a basic catalyst, at a temperature of from 0° to 100° C. under anhydrous conditions.

The compound of the general formula (II') used in the first-named process is preferably a chloroformate of an alkylphenol optionally chain-extended with ethylene oxide or a bischloroformate of an oxyalcohol derived from ethylene oxide and/or propylene oxide.

The compound of the general formula (IIIb) used in the second-named process is an optionally substituted chloroformylacetophenone, chloroformylbenzophenone, or chloroformylthioxanthone.

The processes is advantageously carried out in the presence of at least an equimolar amount of a strong non-nucleophilic base, advantageously a tertiary amine, and at a temperature of from 20° to 60° C.

The processes is preferably carried out in an inert anhydrous solvent, if necessary with the exclusion of moisture.

The synthesis of aryl carbonates not containing co-polymerizable end groups has been revealed (cf. JP-OS 59-001,438, JP-OS 59-170,033). A good overview is given by a) Houben-Weyl, Methoden der Organischen Chemie, Vol. 8, pp. 75, 101–107, Thieme-Verlag 1952, b) Kirk-Othmer, Encyclopedia of Chemical Technology, Vol. 4, pp. 758–771, John Wiley 1978, and c) Ullmann's Encyclopedia of Industrial Chemistry, Vol. A5, pp. 197–202, Verlag Chemie 1986.

The most important method of preparing carbonates comprises the reaction of chloroformates with alcohols. The procedure is described in detail in Houben-Weyl, Vol. 8 (see above) and in DE-PS 1,080,546 and J. Org. Chem. 26, 5119 (1961). The carbonates are formed in good to very good yields when the alcohol and the chloroformate are reacted in a molar ratio of 1:1 in the absence of solvent or in the presence of excess alcohol acting as solvent. In cases where the alcohol or phenol and/or chloroformate are present in the solid state, use can be made of aprotic solvents such as dichloromethane, dichloroethane, acetonitrile, toluene, xylene, etc. It should be noted that the above citations refer exclusively to alcohols of not more than 10 carbon atoms.

The hydroxyacetophenones and hydroxybenzophenones required as starting materials are obtainable by known methods. For example, 4-hydroxybenzophenone is produced in a yield of approximately 90% by Friedel-Crafts acylation of phenol using benzoyl chloride in nitrobenzene in the presence of $AlCl_3$ or $TiCl_4$ (Houben-Weyl, 7/2a, p. 186) or free from isomers by oxidation of 4-hydroxy-diphenylmethane with 5,6-dichloro-2,3-dicyano-p-benzoquinone (Houben-Weyl 7/2a, p. 681).

Methods of synthesizing amino-substituted benzophenones such as 2-benzyl-2-(dimethylamino)-1-(4-hydroxyphenyl)butan-1-one or 1-(4-hydroxyphenyl)-2-methyl-2-morpholinopropan-1-one are described in EP-A 284,561 and EP A 117,223.

2-Hydroxythioxanthone can be prepared from thiosalicylic acid and phenol by the method described in GB-PS 2,108,487 (1981) and GB-PS 2,108,979 (1982).

The aromatic chloroformates (cf. J. Prakt. Chem. 313, p.331, 1971 and loc. cit. 317, pp. 62, 73, and 81, 1975) of the general formula (IIIb) can be prepared in good yields from a substituted phenol, e.g. 4-chloro-5'-fluoro-2'-hydroxybenzophenone, 4-chloro-4'-hydroxybenzophenone, 4,4'-dihydroxybenzophenone, 4-fluoro-4'-hydroxybenzophenone, 4-hydroxybenzophenone, 3-hydroxy-thioxanthone, (4-hydroxyphenyl)-2- hydroxy-2-propylketone (DE-OS 3,534,645) by phosgenation by standard methods disclosed in the literature using phosgene (e.g. Houben-Weyl, Methoden der Organischen Chemie, Vol. 8, Thieme-Verlag 1952), or trichloromethylchloroformate (diphosgene) (J. Prakt. Chem. 126, p. 210, 1930, loc. cit. 128, p. 233, 1930, Chem. Abstr. 95, p. 81766, J. Org. Chem. 50., p. 715., 1985., loc. cit. 41, p. 2070, 1976., Angew. Chem. 89, p. 267, 1977), or crystalline triphosgene (Angew. Chem. 99, p. 922, 1987), or N,N'-carbonyl-diimidazole or N,N'-carbonyl-di-s-triazole (Fieser 1, p. 116, 1967).

Information on the use of alternative methods of phosgenation, e.g. reacting with chloroformates, is given in "Merck Kontakte" 1981 (1), pp. 14–18.

To synthesize the compounds it is necessary to use appropriately substituted mono- and di-alcohols. Examples of such compounds are:

Lutensof®AP 20 (=isononylphenol/ethylene oxide adduct containing, on average, 20 ethylene oxide units), Pluronic®PE 6400 (=ethylene oxide/propylene oxide block polymer, $\overline{M}_w$ approximately 2900). Examples of chloroformates suitable for use as starting products are:

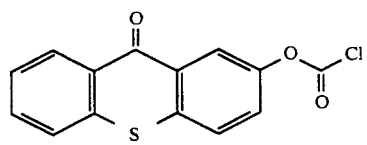

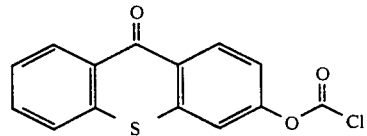

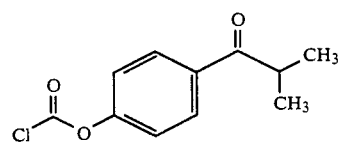

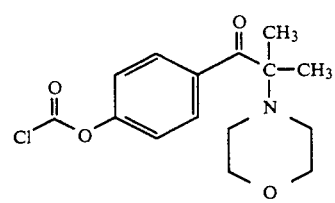

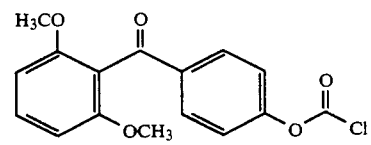

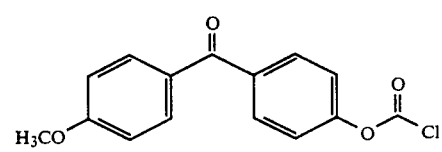

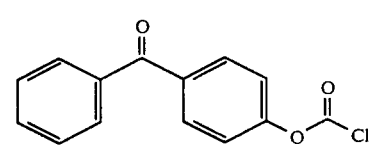

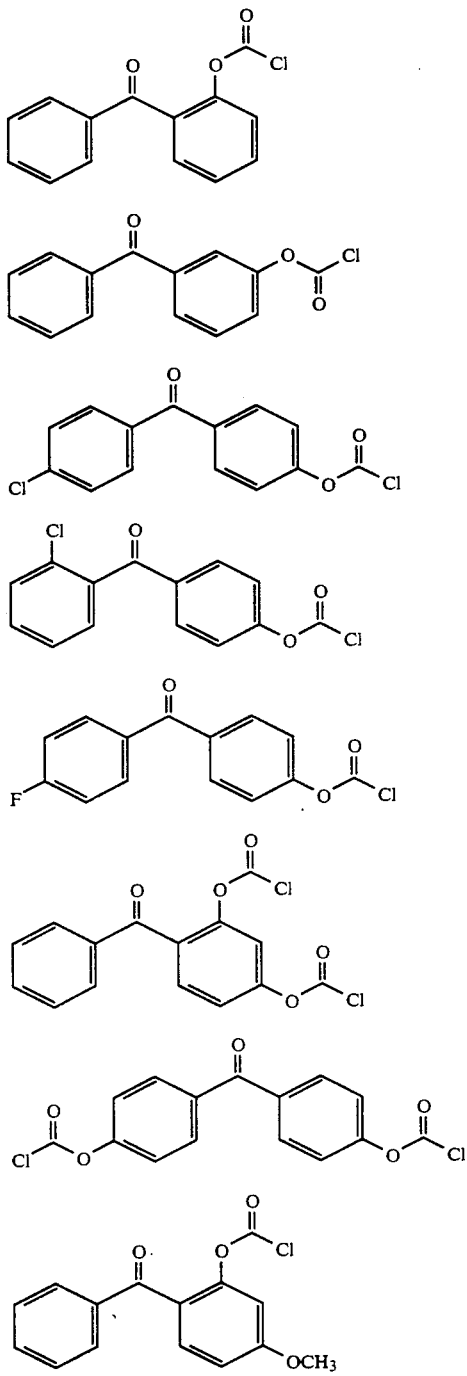

The reaction is carried out in an equimolar ratio (possibly with an excess of from 10% to 30%) or in a molar ratio of 2:1 or 3:1 depending on the number of G—CO—O— groups in the radicals $R^8$ to $R^{12}$, with the exclusion of water and possibly in the presence of an inert solvent or solvent mixture and a basic catalyst, at a temperature of from 0° to 100° C. and preferably from 20° to 50° C.

For the conversion of the hydroxyacetophenones, hydroxybenzophenones or hydroxythioxanthones it will generally be necessary to use the corresponding chloroformates. These may be readily prepared in good yields using methods disclosed in the literature, for example in Eur. Polym. J. 14, p. 205 (1978); J. Polym. Sci. Polym. Symp. 66, p. 41 (1979); and Bull. Soc. Chem. Belg. 93, p. 159 (1984).

ride and concentrating the filtrate to constant weight in an oil pump vacuum.

Similarly, a compound of formula (III) below

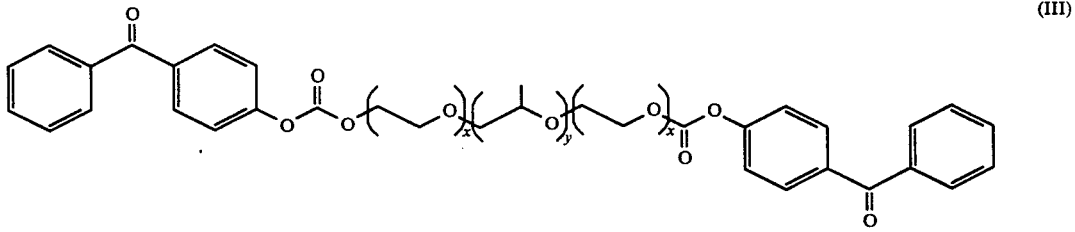

(III)

The acetophenone, benzophenone and thioxanthone derivatives of the invention have been found to be surprisingly easy to produce in good yields.

The manufacturing process will now be described in detail.

The chloroforomates used for the reaction readily react with nucleophilic compounds, including water. For this reason, it is necessary to ensure that the reaction is carried out with the exclusion of all moisture by using dried non-nucleophilic solvents, such as acetonitrile, dichloromethane, dichloroethane, tetrahydrofuran, toluene, xylene, chlorobenzene, ethyl acetate, chloroform, etc. and, if necessary, to establish an inert gas atmosphere of, say, nitrogen, argon, or carbon dioxide.

Usually, the initial contents of the reactor will be a solution or suspension of the hydroxy compound in an inert solvent, which may be dispensed with if the starting compound is liquid at the reaction temperature, together with a basic non-nucleophilic amine, preferably triethylamine, 4-dimethylaminopyridine, imidazole, 1,4-diaza-bicyclo[2.2.2]octane, 1,5-diaza-bicyclo[4.3.0]-non-5-ene, 1,8-diaza-bicyclo[5.4.0]undec-7-ene, polyvinylpyridine, N,N'-dimethylpropylene urea, N,N'-dimethylethylene urea, etc., at a temperature of from 0° to 100° C. and preferably from 10° to 50° C. The chloroformyl compound, possibly dissolved in an inert solvent such as dichloromethane, dichloroethane, acetonitrile, toluene, chlorobenzene, xylene, etc., is then added dropwise with stirring at a temperature in the above range. This procedure is particularly suitable for relatively large batches.

Instead of said chloroformates, the following compounds may be similarly used for the synthesis process: tosylates, imidazolyl, pyrazolyl, and phosphonium, sulfonium, ammonium and pyridinium compounds.

Stirring is continued for from 1 to 48 hours, preferably from 1 to 20 hours, at a temperature of from 10° to 40° C., after which the product is isolated by the standard procedure of filtering, washing, and drying, followed by recrystallization, distillation, or extraction.

For example, a compound of formula (II) below

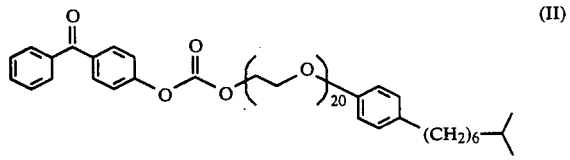

(II)

can be prepared by reacting 4-chloroformylbenzophenone with Lutensol® AP20 (BASF Aktiengesellschaft) in the presence of triethylamine in toluene at 25° C., removing the precipitated triethylamine hydrochloride and concentrating the filtrate to constant weight in an oil pump vacuum.

Similarly, a compound of formula (III) below may be prepared by reacting 4-chloroformylbenzophenone with Pluronic® PE 6400 (ethylene oxide/propylene oxide block polymer, $\overline{M}_w$=approx. 2900) in a molar ratio of 2:1 in the presence of triethylamine in toluene at 25° C., removing the precipitated triethylamine hydrochloride and concentrating the filtrate to constant weight in an oil pump vacuum.

The benzophenone derivatives and heterocyclic benzophenone derivatives of the invention are attached to the ethylene oxide or propylene oxide groups via a carbonate group.

The aromatic carbonyl system may be a derivative of benzophenone, oxanthone, thioxanthone, or acridone.

The phenyl rings of the benzophenone derivatives or heterocyclic benzophenone derivatives may have further substituents attached thereto, for example alkyl, alkoxy, alkylthio, halogen, nitro, amino, alkylamino, dialkylamino, alkanoyl, alkanoylamino, benzoylamino, or sulfonamide groups, in which the alkyl groups, where present, contain from 1 to 4 carbon atoms.

The number of ethylene oxide or other alkylene oxide groups may range from 1 to 80 mole equivalents. A particularly preferred range is 20 to 50 ethylene oxide units.

The aqueous polymer dispersions may, if desired, contain conventional mineral additives such as chalk, pulverized quartz, and/or heavy spar, and/or pigments such as iron oxide red or iron oxide black.

The aqueous dispersions of the invention may be used for the manufacture of paints and coating systems and for impregnating mineral substrates. The aqueous polymer dispersions of the invention are particularly suitable for coating unset concrete roof tiles. Tiles thus treated are distinctly less liable to collect dirt and their resistance to atmospheric corrosion is improved.

In the following Examples, the parts and percentages are by weight unless otherwise stated.

The tendency of the polymer films to accumulate dirt was tested as follows:

Benzophenone or the compound of the general formula (I) stated in the respective Comparative Examples 1b, 2b, 3b and Examples 1d, 2d, 3d and 1f, 2f, 3f were stirred into copolymer dispersions AI, AII, and AIII at 85° C. in the amounts stated.

Each of the dispersions was applied to a glass plate to form thereon a film having a thickness of 200μ.

The film was dried for 1 minute at 70° C. and the coated plate was then left for about 24 hours at room temperature. The film was then irradiated with UV light for 10 minutes using an 80 watt low-pressure lamp (Comparative Examples 1c, 2c, 3c, and Examples 1e, 2e, 3e, and 1g, 2g, 3g, respectively).

15

The dirt attraction capacity of the films was determined by dusting a circular area of diameter approx. 5 cm at the top of the film with pulverized active charcoal by means of a metal sieve. The dusted area was left undisturbed for 1 hour, after which the loose charcoal was removed by tapping the side of the plate followed by a brief rinse with water.

Assessment ratings:
The films were inspected after they had dried.
Residual dirt deposition:
0=none
1=just visible
2=slight
3=low
4=medium
5=high
6=very high The results are listed in the Table below.

Preparation of polymer dispersion (AI):

A 50% w/w polymer dispersion containing 49 parts of methyl methacrylate, 49 parts of 2-ethylhexyl acrylate, and 2 parts of acrylic acid containing 0.5 part of sodium peroxydisulfate, based on the parts by weight of the monomers, was prepared in conventional manner. The monomers were emulsified with 1.5 parts of the sodium salt of a sulfuric acid half-ester of an isononylphenol ethoxylate containing an average of 25 ethylene oxide units and 0.5 part of an isononylphenol ethoxylate having an average of 25 ethylene oxide units, based on the parts by weight of the monomers.

The results of tests for determining the acetone swelling factor and acetone extraction losses and the dirt attraction capacity of the films are listed in the Table below.

COMPARATIVE EXAMPLE 1a

A film prepared from the above polymer dispersion (AI) was irradiated with UV light for 10 minutes using an 80 watt low-pressure lamp.

The results of tests for determining the acetone swelling factor and acetone extraction losses and the dirt attraction capacity of the films are listed in the Table below.

COMPARATIVE EXAMPLE 1b 100 g of the above polymer dispersion (AI) were blended with 0.25 g of benzophenone with stirring at 85° C.

The results of tests for determining the acetone swelling factor and acetone extraction losses and the dirt attraction capacity of the films are listed in the Table below.

COMPARATIVE EXAMPLE 1c

A film prepared from the polymer dispersion of Comparative Example 1b was irradiated with UV light for 10 minutes using an 80 watt low-pressure mercury lamp.

The results of tests for determining the acetone swelling factor and acetone extraction losses and the dirt attraction capacity of the films are listed in the Table below.

EXAMPLE 1d

Invention 100 g of polymer dispersion (AI) described above were blended with 0.05 g of a compound of formula (III) with stirring at 85° C.

The results of tests for determining the acetone swelling factor and acetone extraction losses and the dirt attraction capacity of the films are listed in the Table below.

EXAMPLE 1e

Invention

A film prepared from the polymer dispersion of Example 1d was irradiated with UV light for 10 minutes using an 80 watt low-pressure mercury lamp.

The results of tests for determining the acetone swelling factor and acetone extraction losses and the dirt attraction capacity of the films are listed in the Table below.

EXAMPLE 1f

Invention 100 g of polymer dispersion (AI) described above were blended at 85° C. with stirring with 0.05 g of a compound [of the general formula (I)] containing an isononylphenol/ethylene oxide adduct with an average of 20 ethylene oxide units per nonylphenol group, the said adduct being attached to benzophenone via a carbonate group [=compound of formula (II)].

The results of tests for determining the acetone swelling factor and acetone extraction losses and the dirt attraction capacity of the films are listed in the Table below.

EXAMPLE 1g

Invention

A film prepared from the polymer dispersion of Example 1f was irradiated with UV light for 10 minutes using an 80 watt low-pressure mercury lamp.

The results of tests for determining the acetone swelling factor and acetone extraction losses and the dirt attraction capacity of the films are listed in the Table below.

Preparation of polymer dispersion (AII):

A 50% polymer dispersion was prepared in conventional manner from 59 parts of butyl acrylate, 39 parts of styrene, and 2 parts of acrylic acid containing 0.5 part of sodium peroxydisulfate, based on the parts by weight of the monomers. The monomers were emulsified with 1.5 parts of the sodium salt of a sulfuric acid half-ester of an isononylphenol ethoxylate containing an average of 25 ethylene oxide units and 0.5 part of an isononylphenol ethoxylate having an average of 25 ethylene oxide units, based on the parts by weight of the monomers.

The results of tests for determining the acetone swelling factor and acetone extraction losses and the dirt attraction capacity of the films are listed in the Table below.

COMPARATIVE EXAMPLE 2a

A film prepared from the polymer dispersion (AII) was irradiated with UV light for 10 minutes using an 80 watt low-pressure mercury lamp.

The results of tests for determining the acetone swelling factor and acetone extraction losses and the dirt attraction capacity of the films are listed in the Table below.

COMPARATIVE EXAMPLE 2b 100 g of polymer dispersion (AII) were blended with 0.25 g of benzophenone at 85° C. with stirring.

The results of tests for determining the acetone swelling factor and acetone extraction losses and the dirt attraction capacity of the films are listed in the Table below.

COMPARATIVE EXAMPLE 2c

A film prepared from the polymer dispersion of Example 2b was irradiated with UV light for 10 minutes using an 80 watt low-pressure mercury lamp.

The results of tests for determining the acetone swelling factor and acetone extraction losses and the dirt attraction capacity of the films are listed in the Table below.

EXAMPLE 2d

Invention 100 g of polymer dispersion (AII) were blended with 0.05 g of a compound of formula (III) at 85° C. with stirring.

The results of tests for determining the acetone swelling factor or acetone extraction losses and the dirt attraction capacity of the films are listed in the Table below.

EXAMPLE 2e

Invention

A film prepared from the polymer dispersion of Example 2d was irradiated for 10 minutes with UV light using an 80 watt low-pressure mercury lamp.

The results of tests for determining the acetone swelling factor and acetone extraction losses and the dirt attraction capacity of the films are listed in the Table below.

EXAMPLE 2f

Invention 100 g of polymer dispersion (AII) were blended, at 85° C. with stirring, with 0.05 g of a compound [of the general formula (I)] containing an isononylphenol-/ethylene oxide adduct attached to benzophenone via a carbonate group and having an average of 20 ethylene oxide units per nonylphenol group [=compound of the general formula (II)].

The results of tests for determining the acetone swelling factor and acetone extraction losses and the dirt attraction capacity of the films are listed in the Table below.

EXAMPLE 2g

Invention

A film prepared from the polymer dispersion of Example 2f was irradiated with UV light using an 80 watt low-pressure mercury lamp.

The results of tests for determining the acetone swelling factor and acetone extraction losses and the dirt attraction capacity of the films are listed in the Table below.

Preparation of polymer dispersion (AIII):

An aqueous emulsion is prepared from 210 g of n-butyl acrylate, 200 g of 2-ethylhexyl acrylate, 90 g of styrene, 15 g of acrylic acid, 12.5 g of a 50% aqueous acrylamide solution, 37.5 g of a 20% aqueous solution of the sodium salt of a sulfonic $C_{12}$–$C_{14}$-alkane, 17.5 g of a 20% solution of a fatty alcohol ethoxylate containing 22 ethylene oxide units, and 179 g of water. 15 g of the aqueous emulsion were then mixed with 10% of an aqueous solution of 2.5 g of sodium peroxydisulfate in 100 g of water, and the mixture was heated to the polymerization temperature of 85° C. with stirring. The polymerization temperature was maintained and stirring continued while the remainder of the aqueous emulsion was continuously added over a period of 2 hours and concurrently, through a separate inlet, the remainder of the aqueous initiator solution was continuously added over 2.25 hours, after which polymerization was continued for a further hour and 15 g of an ammoniacal aqueous solution of zinc ammonium bicarbonate (zinc content 16%) was stirred in.

COMPARATIVE EXAMPLE 3a

A film prepared from the polymer dispersion (AIII) was irradiated with UV light for 10 minutes using an 80 watt low-pressure mercury lamp.

The results of tests for determining the acetone swelling factor and acetone extraction losses and the dirt attraction capacity of the films are listed in the Table below.

COMPARATIVE EXAMPLE 3b 100 g of polymer dispersion (AIII) were blended with 0.25 g of benzophenone at 85° C. with stirring.

The results of tests for determining the acetone swelling factor and acetone extraction losses and the dirt attraction capacity of the films are listed in the Table below.

COMPARATIVE EXAMPLE 3c

A film prepared from the polymer dispersion of Example 3b was irradiated with UV light for 10 minutes using an 80 watt low-pressure mercury lamp.

The results of tests for determining the acetone swelling factor and acetone extraction losses and the dirt attraction capacity of the films are listed in the Table below.

EXAMPLE 3d

Invention 100 g of polymer dispersion (AIII) were blended with 0.05 g of a compound of formula (III) at 85° C. with stirring.

The results of tests for determining the acetone swelling factor and acetone extraction losses and the dirt attraction capacity of the films are listed in the Table below.

EXAMPLE 3e

Invention

A film prepared from the polymer dispersion of Example 3d was irradiated with UV light for 10 minutes using an 80 watt low-pressure mercury lamp.

The results of tests for determining the acetone swelling factor and acetone extraction losses and the dirt attraction capacity of the films are listed in the Table below.

EXAMPLE 3f

Invention 100 g of polymer dispersion (AIII) were blended, at 85° C. with stirring, with 0.05 g of a compound [of the general formula (I)] containing an isononylphenol-/ethylene oxide adduct attached to benzophenone via a carbonate group and having an average of 20 ethylene oxide units per nonylphenol group [=compound of the general formula (II)].

The results of tests for determining the acetone swelling factor and acetone extraction losses and the dirt attraction capacity of the films are listed in the Table below.

EXAMPLE 3g

Invention

A film prepared from the polymer dispersion of Example 3f was irradiated with UV light for 10 minutes using an 80 watt low-pressure mercury lamp.

The results of tests for determining the acetone swelling factor and acetone extraction losses and the dirt attraction capacity of the films are listed in the Table below.

TABLE

| Example No. | Acetone Swelling Factor (%) | Acetone Extraction Losses (%) | Dirt Attraction Factor |
|---|---|---|---|
| Polymer dispersion (AI) | partially dissolved | | 4 |
| Comparative Example 1a | 713 | 16.4 | 4 |
| Comparative Example 1b | partially dissolved | | 4 |
| Comparative Example 1c | 700 | 15 | 3 |
| Example 1d | partially dissolved | | 4 |
| Example 1e | 500 | 6.1 | 2 |
| Example 1f | partially dissolved | | 4 |
| Example 1g | 410 | 3.7 | 2 |
| Polymer Dispersion (AII) | partially dissolved | | 3 |
| Comparative Example 2a | 535 | 4.4 | 3 |
| Comparative Example 2b | partially dissolved | | 3 |
| Comparative Example 2c | 435 | 3.4 | 2 |
| Example 2d | partially dissolved | | 3 |
| Example 2e | 310 | 3.0 | 1 |
| Example 2f | partially dissolved | | 3 |
| Example 2g | 320 | 3.1 | 1 |
| Polymer Dispersion (AIII) | 207 | 7.0 | 3 |
| Comparative Example 3a | 202 | 4.0 | 3 |
| Comparative Example 3b | 208 | 6.0 | 3 |
| Comparative Example 3c | 172 | 3.0 | 2 |
| Example 3d | 220 | 6.0 | 3 |
| Example 3e | 202 | 3.0 | 1 |
| Example 3f | 221 | 6.0 | 3 |
| Example 3g | 213 | 3.0 | 1 |

We claim:
1. An aqueous polymer dispersion comprising:
A) a 20-65% w/w aqueous dispersion of a copolymer of
(a) from 0.5 to 5% w/w of units of a $\alpha\text{-}\beta$ unsaturated compound containing one or more carboxyl groups, amide groups or a mixture thereof; and
(b) units of at least two monomers selected from the group consisting of acrylates and methacrylates of $C_{1\text{-}18}$ alkanols and vinyl aromatic compounds;
wherein the total amount w/w of units (a) and (b) total 100% w/w; and
B) from 0.1 to 5% w/w, base on the weight of the copolymer contained in component A) of at least one aromatic ketone of the formula (I)

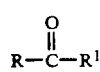  (I)

wherein
R is a straight-chain, $C_1\text{-}C_4$-alkyl radical, a branched-chain $C_3\text{-}C_4$-alkyl radical, a $C_6\text{-}C_{20}$-aryl radical, or a radical $R^1$, wherein $R^1$ is defined below,
$R^1$ is

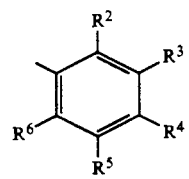

wherein
$R^2\text{-}R^6$ each independently are H, $C_1\text{-}C_4$-alkyl or phenyl, provided that at least one, but not more than three, of the radicals $R^2\text{-}R^6$ stand for a radical of the formula

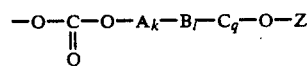

wherein A, B, and C are each independently
i) a divalent oxyalkylene radical of the formula

wherein $R^a$ and $R^b$ are each independently H, OH, aryl, COOH, $COOCH_3$, $COOC_2H_5$, or $C_{1\text{-}4}$ alkyl, and
y is an integer from 1 to 80;
ii) a radical of the formula

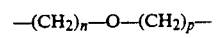

where n is an integer from 1 to 5 and p is an integer from 1 to 5;
iii) a polyoxyalkylene radical of from 2 to 20 oxygen atoms linked by at least one $-CH_2-$ or $-CH_2-CH(CH_3)-$ group;
iv) a radical of the formula

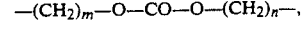

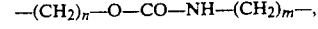

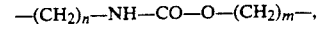

—$(CH_2)_m$—CO—O—$(CH_2)_n$—, or

—$(CH_2)_m$—O—CO—$(CH_2)_n$—, wherein m is an integer from 1 to 10 and n is an integer from 1 to 10;

v) a $C_{5-10}$ cycloalkylene radical, a (bis)methylenecycloalkylene radical of from 6 to 12 carbon atoms or o—, m— or p— phenylene radical; and k, l and q are each an integer from 1 to 80; and Z is H, $C_{1-6}$ alkyl, phenyl, straight chain $C_{1-20}$ alkyl substituted phenyl, branched-chain $C_{1-20}$ alkyl substituted phenyl or a radical of the formula

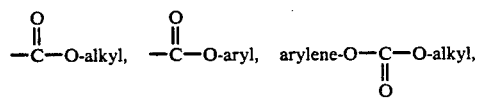

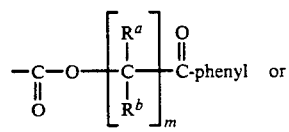

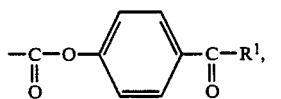

wherein the alkyl radicals contain from 1 to 8 carbon atoms and the aryl radicals contain from 6 to 18 carbon atoms, and wherein $R^a$, $R^b$, or $R^1$ and m are defined as above; or when R denotes an aryl radical, one of the radicals $R^2$ to $R^6$ is O, S, NH, or NR''' which links the aryl radical to $R^1$ in its ortho-position wherein R''' is H or a $C_1$-$C_8$-alkyl.

2. The aqueous polymer dispersion of claim 1, further comprising an element selected from the group consisting of mineral additives, pigments, and a mixture thereof.

3. The aqueous polymer dispersion of claim 1, wherein $A_k$ and $C_q$ are single bonds wherein the radical $B_l$ contains at least two oxygen atoms.

4. The aqueous polymer dispersion of claim 1, wherein said aromatic ketone has the following structure:

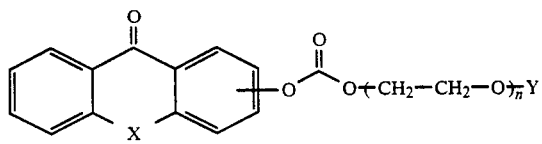

or

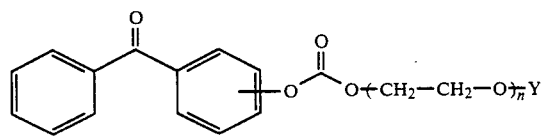

or

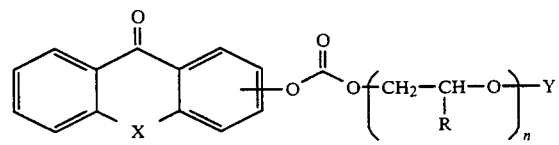

or

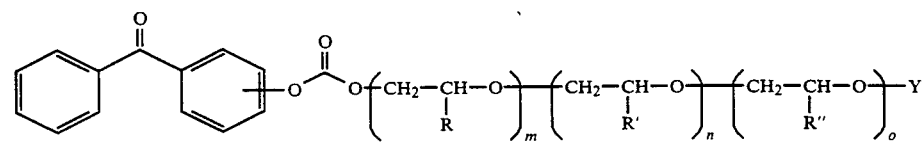

or

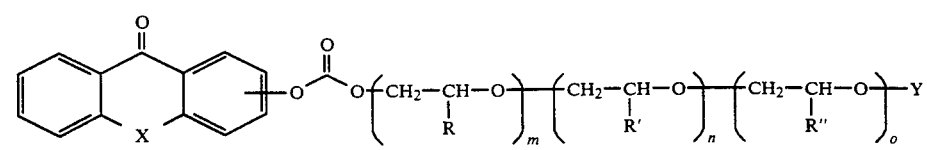

or

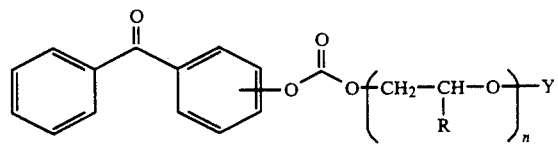
wherein
X is O, S, NH or NR''',
R, R', R'' and R''' are independently H or $C_{1-8}$ alkyl, and
Y is H, $C_{1-8}$ alkyl, phenyl, phenyl substituted by a $C_{1-20}$ substituent, or a radical of the formula
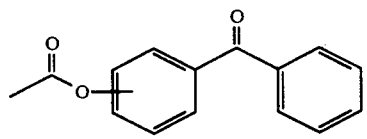
wherein n, m and o are independently integers from 1 to 80.
* * * * *